US008296477B1

(12) United States Patent
Polk

(10) Patent No.: US 8,296,477 B1
(45) Date of Patent: Oct. 23, 2012

(54) SECURE DATA TRANSFER USING LEGITIMATE QR CODES WHEREIN A WARNING MESSAGE IS GIVEN TO THE USER IF DATA TRANSFER IS MALICIOUS

(75) Inventor: Garret Polk, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/092,306

(22) Filed: Apr. 22, 2011

(51) Int. Cl.

| | |
|---|---|
| ***G06Q 99/00*** | (2006.01) |
| ***G06F 12/14*** | (2006.01) |
| ***G06F 7/30*** | (2006.01) |

(52) U.S. Cl. ................ 710/18; 710/15; 710/16; 710/17; 710/19; 705/1; 705/14; 705/35; 705/51; 705/64

(58) Field of Classification Search ............. 710/15–19; 705/14, 64

See application file for complete search history.

(56) References Cited

U.S. PATENT DOCUMENTS

| | | | | |
|---|---|---|---|---|
| 8,140,417 | B2 * | 3/2012 | Shibata | 705/35 |
| 2005/0203854 | A1 * | 9/2005 | Das et al. | 705/64 |
| 2007/0174198 | A1 * | 7/2007 | Kasahara et al. | 705/51 |
| 2007/0214043 | A1 * | 9/2007 | Yasuda | 705/14 |
| 2008/0281624 | A1 * | 11/2008 | Shibata | 705/1 |
| 2009/0172780 | A1 * | 7/2009 | Sukeda et al. | 726/3 |
| 2010/0327066 | A1 * | 12/2010 | Khan | 235/462.01 |
| 2011/0002012 | A1 * | 1/2011 | Amagai | 358/3.28 |
| 2011/0233284 | A1 * | 9/2011 | Howard | 235/494 |
| 2012/0010930 | A1 * | 1/2012 | Langdon et al. | 705/14.16 |
| 2012/0091194 | A1 * | 4/2012 | Borucki | 235/375 |
| 2012/0130817 | A1 * | 5/2012 | Bousaleh et al. | 705/14.58 |
| 2012/0131094 | A1 * | 5/2012 | Lyons et al. | 709/203 |

OTHER PUBLICATIONS

U.S. Appl. No. 13/044,877.
U.S. Appl. No. 13/044,855.
"Android Cloud to Device Messaging Framework—Google Projects for Android: C2DM (Labs)," Google, 2011, 16 pages [Online] [Retrieved on Aug. 15, 2011] Retrieved from the Internet<URL:http://code.google.com/android/c2dm/>.
Bray, T., "Powering Chrome to Phone with Android Cloud to Device Messaging," Android Developers, Posted on Aug. 11, 2010, Google Inc., 2008, 3 pages, [Online] [Retrieved on Aug. 15, 2011] Retrieved from the Internet<URL:http://android-developers.blogspot.com/2010/08/powering-chrome-to-phone-with-android...>.
"Near field communication," Last Modified Aug. 12, 2011, Wikipedia®, 17 pages, [Online] [Retrieved on Aug. 15, 2011] Retrieved from the Internet<URL:http://en.wikipedia.org/wiki/Near_field_communication>.

* cited by examiner

*Primary Examiner* — Tammara Peyton
(74) *Attorney, Agent, or Firm* — Fenwick & West LLP

(57) ABSTRACT

User data is securely transferred from a client device to a mobile device. Data transfer activities at the client are monitored to detect a request to transfer data via a displayed code (e.g., QR code). The data being transfer are verified as being legitimate (e.g., not compromised by malware or otherwise malicious) before the transfer. Responsive to verifying that the transfer data are legitimate, a code encoding the transfer data is displayed on a display device of the client. A user of the mobile device captures the code using a digital camera or other data scanning device and decodes the code to obtain the transfer data. The mobile device may then perform an action using the transfer data, such as connecting to a website or composing an email to an address included in the transfer data.

17 Claims, 4 Drawing Sheets

SECURE DATA TRANSFER USING LEGITIMATE QR CODES WHEREIN A WARNING MESSAGE IS GIVEN TO THE USER IF DATA TRANSFER IS MALICIOUS

BACKGROUND OF THE INVENTION

1. Field of the Invention

This invention pertains in general to computer security and in particular to secure data transfer using quick response (QR) and other forms of codes.

2. Description of the Related Art

Users of modern electronic devices face a wide variety of threats. For example, innocent-looking websites can surreptitiously phish confidential information from users. The websites and other sources can also provide malicious software (malware) such as computer viruses, worms, Trojan horse programs, spyware, adware, and crimeware. The malware can surreptitiously capture important information such as logins, passwords, bank account identifiers, and credit card numbers. Similarly, malware can provide hidden interfaces that allow the attacker to access and control the compromised device, or that charge hidden fees to the user of the device.

Transferring information (e.g., a universal resource locator (URL) to a website) across multiple devices (e.g., from a personal computer to a mobile phone) amplifies the potential threats because the information can be intercepted and subverted before it reaches a receiving device. In order to help users secure the information transfer, various information encoding techniques, such as quick response (QR) codes and other types of bar codes, are used to encode and/or encrypt the information to be transferred. For example, QR codes can be used to encode URLs, telephone numbers, email addresses and contact information being transferred to a device. The receiving device (e.g., the mobile phone) accesses the information contained in the QR codes with a QR code reader application running at the receiving device. Using the decoded information, a user of the device can, e.g., connect to a web page or call a phone number referenced in the information.

Existing data transfer schemes using QR codes rely on the assumption that the data to be transferred are legitimate (e.g., not compromised by malware or otherwise malicious). However, the data to be transferred can pose security risks to a receiving device. For example, a website referenced by a URL sent to the device via a QR code can distribute malicious software and/or have a bad reputation for exposing confidential information. Similarly, a phone number sent to the device can result in hidden charges to the user of the device, even if the phone number is embedded within contact information for a legitimate entity. As a result, a user of the receiving device can be misled into interacting with data that expose the user to malicious activity.

BRIEF SUMMARY

The above and other needs are met by methods, computer-readable storage media, and systems for secure data transfer using QR or other types of codes.

One aspect provides a computer-implemented method for securely transferring data using a displayed code. Embodiments of the method comprise monitoring data transfer activities at a client to detect a request to transfer data via a displayed code. The method verifies that the transfer data are legitimate (e.g., not compromised by malware or otherwise malicious), and permits display of a code encoding the transfer data responsive to verifying that the transfer data are legitimate.

Another aspect provides a non-transitory computer-readable storage medium storing executable computer program instructions for securely transferring data using a displayed code. The computer-readable storage medium stores computer program instructions for monitoring data transfer activities at a client to detect a request to transfer data via a displayed code. The computer-readable storage medium further stores computer program instructions for verifying that the transfer data are legitimate, and for permitting display of a code encoding the transfer data responsive to verifying that the transfer data are legitimate.

Still another aspect provides a computer system for securely transferring data using a displayed code. The system comprises a non-transitory computer-readable storage medium storing executable computer program modules including a monitoring module, a data verification module and a display module. The monitoring module is for monitoring data transfer activities at a client to detect a request to transfer data via a display code. The data verification module is for verifying that the transfer data are legitimate. The displaying module is for permitting display of a code encoding the transfer data responsive to verifying that the transfer data are legitimate.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
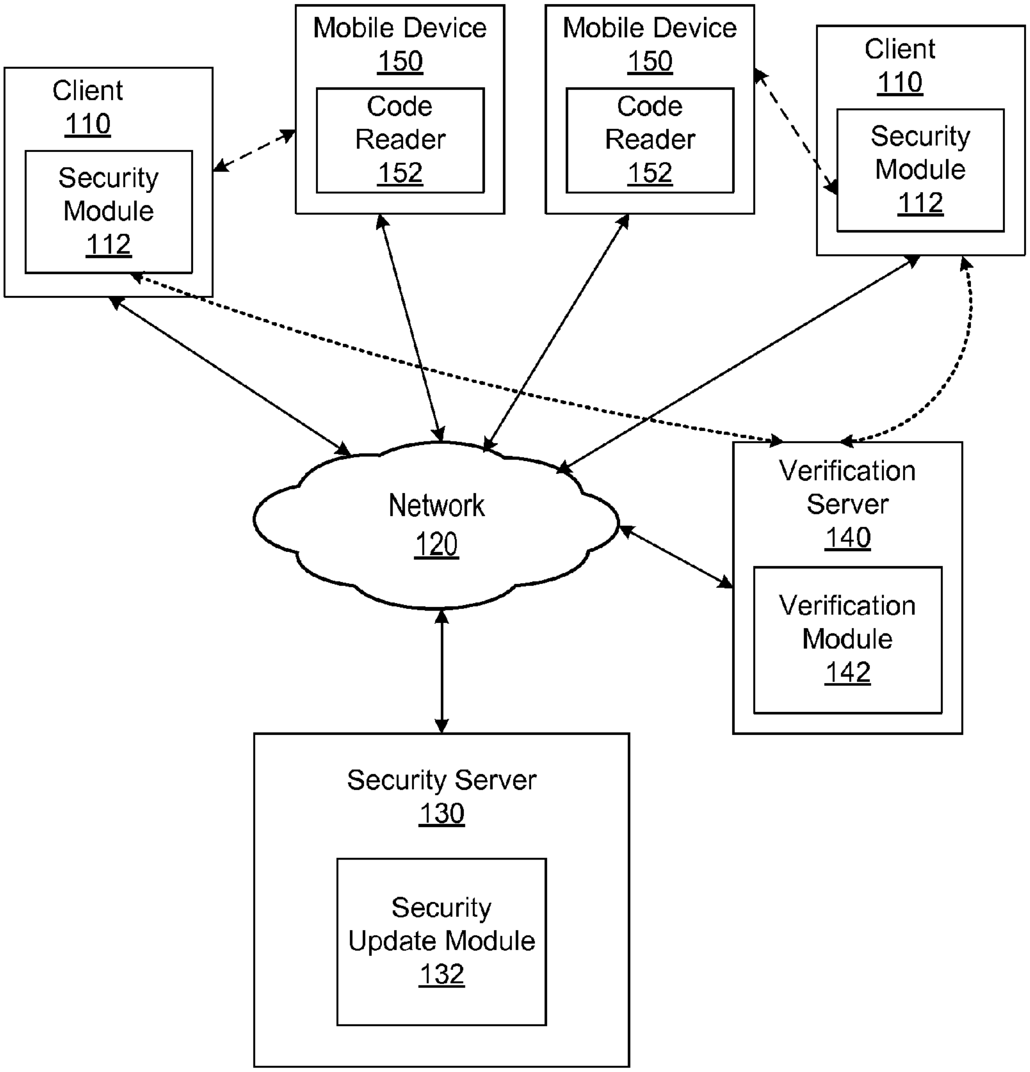
FIG. 1 is a high-level block diagram of a computing environment for securely transferring data using QR or other types of codes according to one embodiment.

FIG. 1 is a high-level block diagram of a computing environment 100 for secure data transfer using QR or other types of codes according to one embodiment. FIG. 1 illustrates a security server 130, a verification server 140, two clients 110 and two mobile devices 150 connected by a network 120. The illustrated environment 100 represents a typical computing environment where multiple clients 110 interact with the security server 130 and/or a verification server 140 to securely transfer data from the clients 110 to the mobile devices 150. Only two clients 110 and their associated mobile devices 150 are shown in FIG. 1 in order to simplify and clarify the description. Embodiments of the computing environment 100 can have many clients 110, mobile devices 150, security servers 130 and/or verification servers 140 connected to the network 120.

The client 110 is used by a user to browse websites on the network 120, as well as to interact with the mobile device 150 associated with the client 110, the security server 130, the verification server 140 and/or other entities. In one embodiment, the client 110 is a personal computer (PC) such as a desktop, notebook, or tablet computer. In other embodiments, the client 110 is a mobile telephone, personal digital assistant, television set-top box, or other electronic device. The client 110 includes a monitor, touchscreen, or other form of display device on which it can display visual information.

In one embodiment, a user uses the client 110 to transfer data to the mobile device 150 by way of information displayed on the display device. For example, the user can cause the client 110 to display a bar code on the display device that encodes in a visual representation the data to be transferred. The visual representation is typically machine-readable but not human-readable. In one embodiment, the visual representation is a specific form of matrix barcode referred to as a "QR code." However, other embodiments can transfer data using other visual representations of the data, such as representations using other forms of barcodes (e.g., a stacked barcode) or codes that are not based on barcodes. Thus, while this description refers to using QR codes, it will be understood that "QR code" also covers other coding techniques.

The client 110 executes a security module 112 that verifies that the transfer data are legitimate, i.e., that the data being transferred do not include or reference malware or other malicious information. The security module 112 monitors data transfer activities by the client 110 and detects when a QR code-based data transfer is being initiated. The security module 112 identifies the data being transferred and verifies that the transfer data are legitimate. The types of verification the security module 112 performs on the transfer data depend on the type of transfer data. For example, if the transfer data include a URL for a website, the security module 112 can verify that the website has a good reputation (i.e., is not known to distribute malware or engage in other malicious activities). If the transfer data verify as legitimate, the security module 112 allows the QR code for the data to display on the client 110 so that the user can transfer the data to the mobile device 150. If the transfer data do not verify as legitimate, the security module 112 blocks the data transfer, notifies the user of the client 110, and/or performs other remediation actions.

The mobile device 150 is a electronic device such as a mobile phone, tablet computer or personal digital assistant. While these types of devices are typically "mobile" in that they are small, lightweight, and can be carried by a person, the mobile device 150 need not be portable. The mobile device 150 is used by a user who may be, but is not necessarily, the same user that uses the client 110 associated with the mobile device. The mobile device 150 includes a digital camera or other optical sensor with which the mobile device can capture QR codes and other information displayed on the display device of the client 110. In one embodiment, the mobile device 150 executes a code reader module 152 that reads the code captured by the camera and decodes the code to reveal the transferred data. The mobile device 150 can then use the transferred data by, e.g., browsing a web page at a URL described in the data, calling, texting, or otherwise sending a message to a telephone number or email address described in the data, and/or storing contact information described in the data.

The security server 130 interacts with the clients 110 via the network 120 to provide the security modules 112 and related information that the clients use to verify that transfer data are legitimate. In one embodiment, a security update module 132 at the security server 130 frequently updates the security modules 112 to ensure that the clients 110 have access to the most recent security-related information. For example, the security update module 132 can collect hygiene information from clients 110 and/or other sources, use the hygiene information to calculate reputations for websites, files, telephone numbers, or other entities, and provide the reputations to the security modules 112. The security update module 132 can likewise maintain and update whitelists of known legitimate entities and/or blacklists of known malicious entities and provide these lists to the security modules 112.

In one embodiment, some of the transfer data verification functions ascribed to the security modules 112 are instead performed by a verification server 140 remote from the clients 110. In this embodiment, the security modules 112 interact with a verification server 140 to verify the transfer data. The verification server 140 includes one or more servers connected to the clients 110 and security server 130 via the network 120. The verification server 140 can be operated by the same entity that operates the security server 130 or by a third party. Further, in one embodiment some clients 110 use local security modules 112 to verify transfer data while other clients use the verification server 140 for the same task.

The verification server 140 executes a verification module 142 that receives a verification request and the transfer data from the security module 112 of a client 110 and replies with an indication of whether the data verify as legitimate. For example, a security module 112 can provide a URL within data that a user is requesting to transfer to a mobile device 150 to the verification server 140 as part of a request to verify that the URL is legitimate. The verification server 140, in turn, replies with a message indicating the verification result of the URL. The verification server 140 can use all or some of the techniques discussed in connection with the client security modules 112 to determine whether transfer data are legitimate.

Depending on the embodiment, one or more of the functions of the security server 130 and/or verification server 140 can be provided by a cloud computing environment. As used herein, "cloud computing" refers to a style of computing in which dynamically scalable and often virtualized resources are provided as a service over the network 120. Functions attributed to the clients 110 and security modules 112 can also be provided by the cloud computing environment.

The network 120 enables communications among the clients 110, mobile devices 150, security server 130 and verification server 140 and can comprise the Internet as well as mobile telephone networks. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
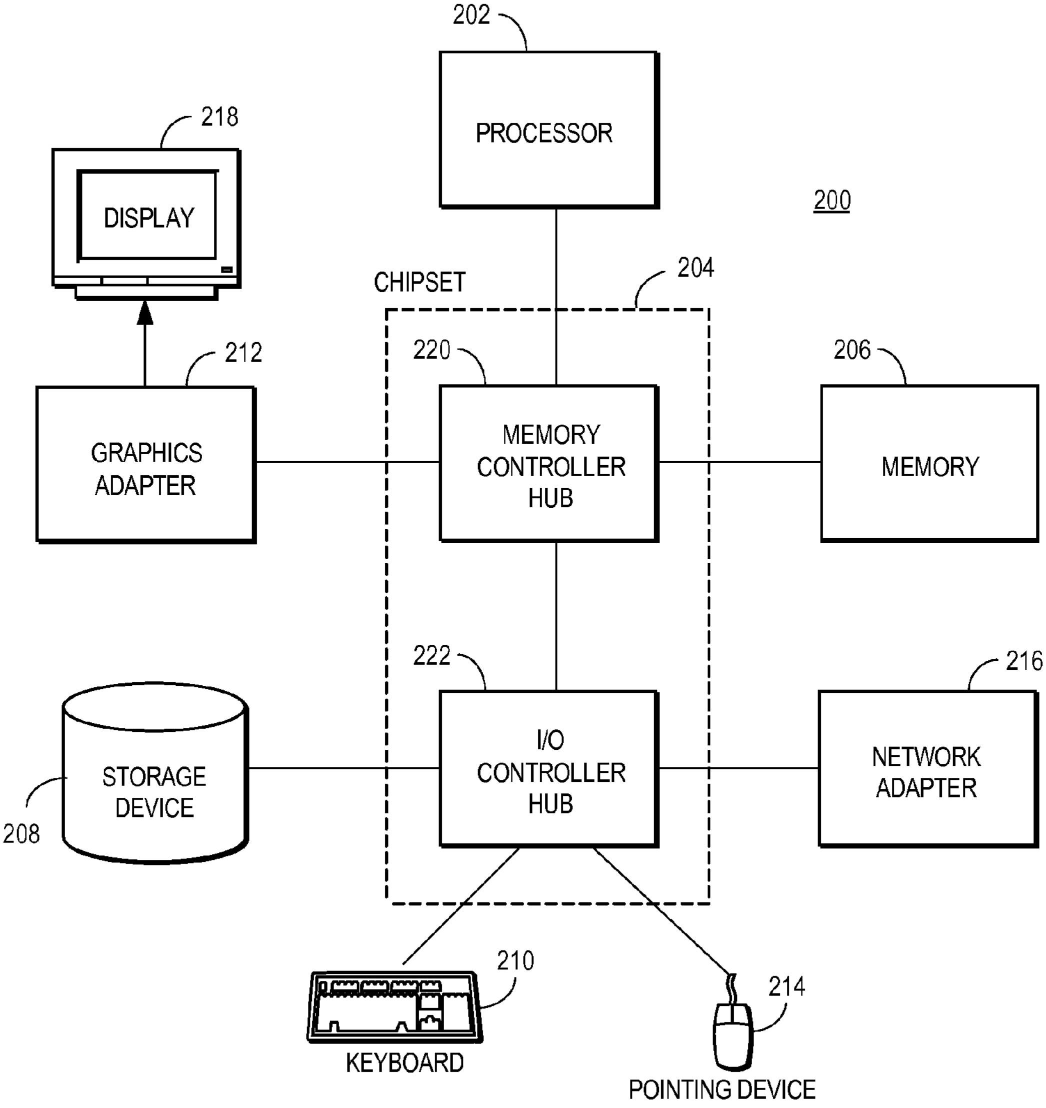
FIG. 2 is a high-level block diagram of a computer for acting as a client, a mobile device, security server, and/or verification server according to one embodiment.

FIG. 2 is a high-level block diagram of a computer 200 for acting as a client 110, mobile device 150, security server 130, and/or verification server 140. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a security server 130 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
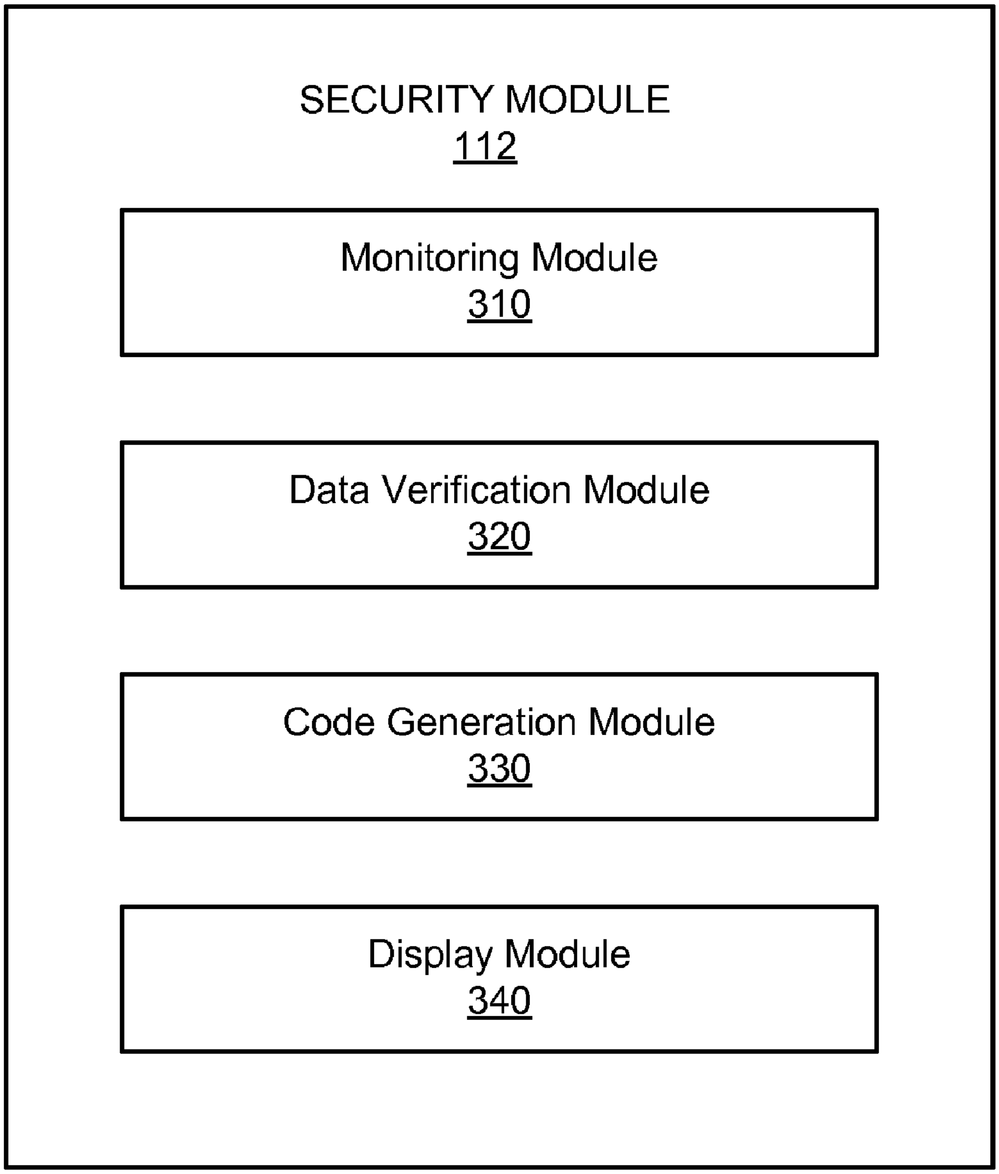
FIG. 3 is a high-level block diagram illustrating a detailed view of a security module of a client according to one embodiment.

FIG. 3 is a high-level block diagram illustrating a detailed view of a security module 112 of a client 110 according to one embodiment. In some embodiments, the security module 112 is incorporated into an operating system executing on the client 110 while in other embodiments the security module 112 is a standalone application or part of another product. As shown in FIG. 3, the security module 112 includes a monitoring module 310, a data verification module 320, a code generation module 330 and a display module 340. Those of skill in the art will recognize that other embodiments of the security module 112 can have different and/or other modules than the ones described here, and that the functionalities can be distributed among the modules in a different manner.

The monitoring module 310 monitors data transfer activities at the client 110 and detects requested data transfers to a mobile device 150. The monitoring module 310 can monitor the data transfer activities using a variety of different techniques. In one embodiment, the monitoring module 310 executes as a service or other form of background process and detects activation of one or more messaging services on the client 110 that signify a requested data transfer to a mobile device using a QR code or other visual representation of the data. For example, the monitoring module 310 can detect data being pushed from a web browser executing on the client 110 to another process, such as to a process that generates QR codes. This data push might be in the form of a copy and paste operation, where the user uses the client 110 to copy data such as a URL or phone number from a browser or similar application and pastes the data into another application.

Similarly, the monitoring module 310 can execute as a browser helper object or other form of application plug-in. As a browser helper object, the monitoring module 310 can monitor activities by the browser that indicate a requested data transfer. Such activities can include attempts by the browser or other browser helper objects to activate a module for generating a QR code. Likewise, the monitoring module 310 can examine images displayed by the browser to identify images that contain or are likely to contain QR or other forms of codes.

In another embodiment, the security module 112 itself functions as the application that generates the QR code for transferring the data to the mobile device 150. In this embodiment, the monitoring module 310 can provide a user interface element, such as a data entry field, in which the user can explicitly provide the transfer data. For example, the monitoring module 310 can include a text box in which the user can type or paste a URL to be transferred. Similarly, the monitoring module 310 can provide an interface by which the browser or another application executing on the client 110 can send the transfer data to the monitoring module 310.

Upon detecting a requested data transfer to a mobile device 150, the monitoring module 310 identifies the data involved in the requested transfer. For example, the monitoring module 310 can identify the data being sent from the browser to a different code generation application or explicitly provided to the monitoring module 310. The transfer data typically reference another location. Thus, the data can include a URL pointing to a web page or other content on the network 120, a phone number, an email address, etc.

In addition, in embodiments where an application other than the security module 112 to generate the QR code, the monitoring module 310 intercepts the data transfer to prevent it from reaching its intended destination. For example, the monitoring module 310 can use operating system hooks or other techniques to block data being sent from the web browser from reaching its destination process. Likewise, the monitoring module 310 can prevent the browser from displaying an image of a QR code downloaded from a website. This interception of the data provides the security module 112 with the opportunity to verify that the data are legitimate before allowing the data transfer to the mobile device 150.

A data verification module 320 determines whether the transfer data are legitimate, i.e., not malicious. Depending upon the embodiment, the data verification module 320 can perform the verification locally, on the client 110, and/or by interacting with the verification server 140 via the network 120. Discussing the local embodiment first, in general the data verification module 320 determines whether the transfer data are associated with known legitimate or known malicious activity. Thus, for transfer data such as a URL, phone number, or email address, the data verification module 320 can determine whether the data are listed on a whitelist of known legitimate transfer data or on a blacklist of known malicious transfer data. The data verification module 320 can also determine whether a phone number, email address, or other contact information in the transfer data matches known contact information for an entity referenced by the transfer data. If the data do not match, the data are presumed malicious and thus not legitimate.

Similarly, the data verification module 320 can determine a reputation associated with the transfer data. If the transfer data include a URL, the data verification module 320 can determine the reputation of the website pointed to by the URL. The reputation describes the likelihood that the website distributes malicious software, mishandles personally identifiable information, or engages in other undesirable behaviors. In one embodiment, the reputation is determined based on signals collected by the security server 130 from many clients 110, such as reports from clients 110 describing websites that distributed malware to the clients 110. The reputation can also be based on one or more other signals, such as the hygiene (e.g., frequency of malware detections) of clients 110 that tend to visit the website, whether the website is signed with a security certificate, e.g., an Extended Validation Certificate, whether the website is known to not request personally-identifiable information, etc. The reputation can be described as a numeric score, with "good" versus "bad" reputations determined using a threshold. In one embodiment, the data verification module 320 determines the reputation associated with the transfer data by querying the security server 130 or another server on the network 120 and receiving the reputation score in response. Transfer data that reference an entity with a good reputation are legitimate, while data that reference an entity with a bad reputation are not legitimate.

If the transfer data reference executable content (e.g. a URL in the transfer data references an executable file at a website), the data verification module 320 can determine whether the executable content includes malware. For example, the data verification module 320 can retrieve the executable content and examine it using a malware scanner to determine whether it is malicious. Likewise, the data verification module 320 can determine the reputation of the executable content. Executable data that include malware and/or have a bad reputation are not legitimate.

In an embodiment where the data verification module 320 interacts with the verification server 140, the data verification module 320 sends the transfer data, or a description of the transfer data, to the verification server 140. For example, the monitoring module 310 can receive transfer data input by the user and provide the data to the verification server 140. The verification server 140 responds to the data verification module 320 with an indication of whether the transfer data are verified as legitimate. The verification server 140 can use the techniques described above (e.g., reputation, malware scanning) to determine whether the transfer data are legitimate.

If the data verification module 320 determines that the transfer data are not legitimate, the data verification module 320 blocks the data transfer. The data verification module 320 can block the data transfer by not allowing the transfer data to be displayed as a QR code. The data verification module 320 can block data intercepted by the monitoring module 310 to reach its intended destination, prevent the browser from displaying an image containing a QR code, and/or perform other such actions. In one embodiment, the data verification module 320 displays a message to the user of the client 110 describing why the data transfer was blocked. Alternatively, upon determining that the transfer data are not legitimate, the data verification module 320 can allow the transfer to proceed but display a message or other indication to the user of the client 110 warning of the risks associated with the data. For example, the data verification module 320 can display a reputation score associated with the transfer data and/or a graphical icon illustrating the risks.

If the data verification module 320 determines that the transfer data are legitimate, it allows the data transfer to proceed. In one embodiment, the transfer data are passed to the code generation module 330 which, in turn, generates the visual representation of the code for the transfer. In one embodiment, the code generation module 330 generates a QR code, which consists of black elements arranged in a square pattern on a white background.

While FIG. 3 illustrates the code generation module 330 as within the security module 112, the functionality of the code generation module 330 can be provided by a module external to the security module 112, such as by the operating system, a different module on the client 110, or the verification server 140. In an embodiment where the code of the transfer data is received from a website or is otherwise already generated, the data verification module 320 allows the code to be displayed on the client 110 if the transfer data are legitimate. For example, the data verification module 320 can allow the browser to display the image of the code in a web page.

The display module 340 interacts with the code generation module 330 and the data verification module 320. The display module 340 displays information on the display device of the client 110. Thus, if the transfer data are verified as legitimate, the display module 340 displays the code generated by the code generation module 330. Likewise, if the transfer data are not legitimate, the display module 340 can display a warning message and/or other information on the display device. As with the code generation module 330, in some embodiments the display module 340 is performed by a module external to the security module 112.

Figure 4:
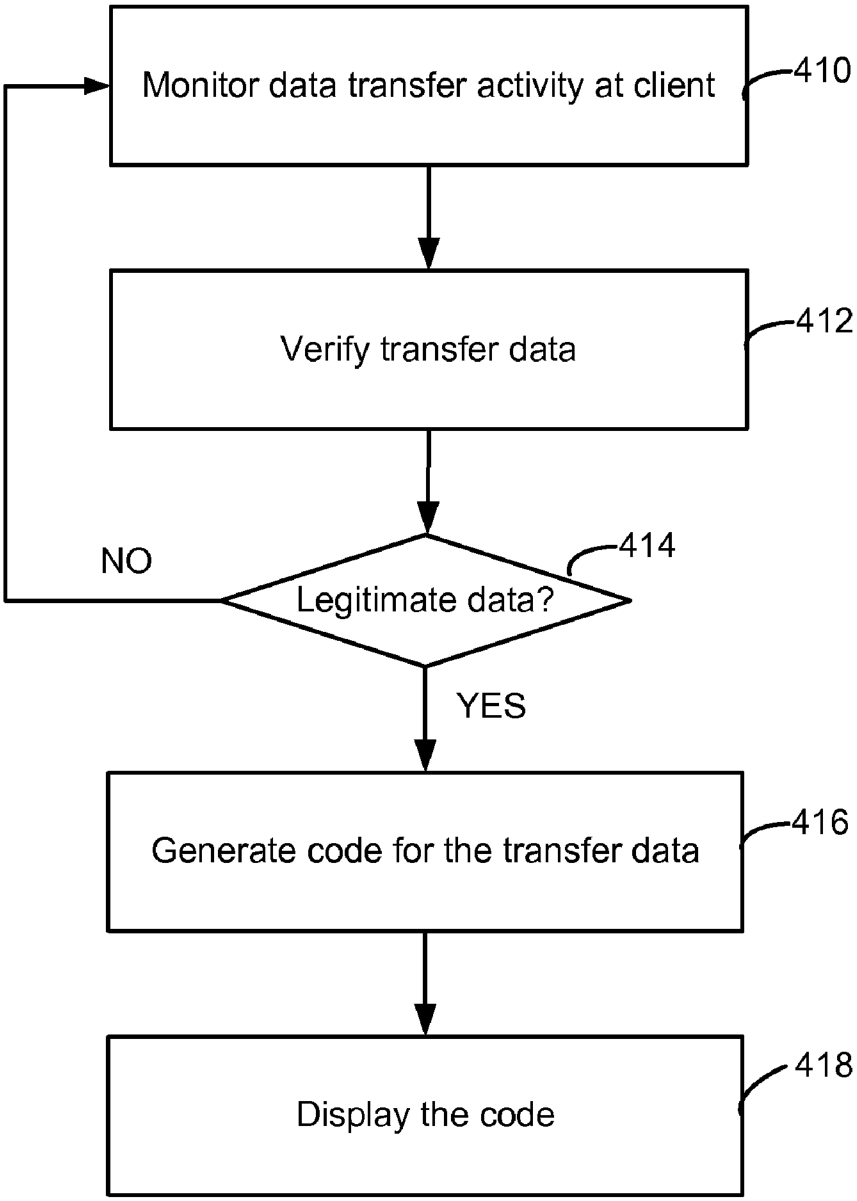
FIG. 4 is a flowchart illustrating steps performed by the security module according to one embodiment.

FIG. 4 is a flowchart illustrating steps performed by the security module 112 according to one embodiment. Other embodiments perform the illustrated steps in different orders, and/or perform different or additional steps. Moreover, some of the steps can be performed by modules other than the security module 112.

Initially, the security module 112 monitors 410 data transfer activities at the client 110 to detect a requested data transfer to a mobile device 150 associated with the client 110. Upon detecting a requested data transfer activity, the security module 112 verifies 412 that the transfer data are legitimate. For example, if the transfer data include the URL of a website, the security module 112 can determine the reputation score of the website. The security module 112 determines that the transfer data are legitimate if the website has a good reputation.

If 414 the transfer data are legitimate, the security module 112 generates 416 a code for the transfer data, if necessary. The code visually represents the transfer data in a machine-readable format, such as a QR code. The security module 112 displays 418 the code on a display device of the client 110. A user of the mobile device 150 can capture the code using a digital camera and a module executing on the mobile device 150 can decode the code to obtain the transfer data. The mobile device 150 may then perform an action using the transfer data, such as connecting to a website or composing an email to an address included in the transfer data.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of securely transferring data using a displayed code, the method comprising:

monitoring data transfer activities at a client to detect a request to transfer data to a mobile device by displaying a quick response (QR) code on a display of the client;

determining whether the transfer data are malicious based on a reputation of an entity referenced by the transfer data;

responsive to determining that the transfer data are not malicious, permitting display of the QR code encoding the transfer data on the display of the client; and responsive to determining that the transfer data are malicious:

preventing display of the QR code on the display of the client; and displaying a warning message to a user of the client.

2. The method of claim 1, wherein monitoring data transfer activities at the client comprises:

receiving transfer data explicitly provided by a user of the client.

3. The method of claim 1, wherein monitoring data transfer activities at the client comprises:

detecting a request by a browser executing on the client to activate a module for generating a QR code encoding the transfer data.

4. The method of claim 1, wherein determining whether the transfer data are malicious comprises:

providing the transfer data to a remote verification server, the verification server adapted to send a response to the client indicating whether the transfer data are malicious.

5. The method of claim 1, wherein determining whether the transfer data are malicious comprises:

determining a reputation of an entity referenced by the transfer data, wherein the transfer data are determined not malicious responsive to the entity having a good reputation.

6. The method of claim 1, wherein determining whether the transfer data are malicious comprises performing one or more steps from the group of steps consisting of:

determining whether the transfer data are on a whitelist of known legitimate transfer data; and determining whether the transfer data are on a blacklist of known malicious transfer data.

7. The method of claim 1, wherein permitting display of the QR code encoding the transfer data comprises:

generating a QR code comprising a machine-readable visual representation of the transfer data; and displaying the QR code on the display of the client.

8. The method of claim 1, wherein the warning message to the user of the client indicates that the transfer data are malicious.

9. A non-transitory computer-readable storage medium storing executable computer program instructions for securely transferring data using a displayed code, the computer program instructions comprising instructions for:

monitoring data transfer activities at a client to detect a request to transfer data to a mobile device by displaying a quick response (QR) code on a display of the client;

determining whether the transfer data are malicious based on a reputation of an entity referenced by the transfer data;

responsive to determining that the transfer data are not malicious, permitting display of the QR code encoding the transfer data on the display of the client; and responsive to determining that the transfer data are malicious:

preventing display of the QR code on the display of the client; and displaying a warning message to a user of the client.

10. The computer-readable storage medium of claim 9, wherein the computer program instructions for monitoring data transfer activities at the client comprises instructions for:

detecting a request by a browser executing on the client to activate a module for generating a QR code encoding the transfer data.

11. The computer-readable storage medium of claim 9, wherein the computer program instructions for determining whether the transfer data are malicious comprises instructions for:

providing the transfer data to a remote verification server, the verification server adapted to send a response to the client indicating whether the transfer data are malicious.

12. The computer-readable storage medium of claim 9, wherein the computer program instructions for determining whether the transfer data are malicious comprises instructions for:

determining a reputation of an entity referenced by the transfer data, wherein the transfer data are determined not malicious responsive to the entity having a good reputation.

13. The computer-readable storage medium of claim 9, wherein the computer program instructions for permitting display of the QR code encoding the transfer data comprises instructions for:

generating a QR code comprising a machine-readable visual representation of the transfer data; and displaying the QR code on the display of the client.

14. A system for securely transferring data using a displayed code comprising:

a non-transitory computer-readable storage medium storing executable computer program modules comprising:

a monitoring module for monitoring data transfer activities at a client to detect a request to transfer data to a mobile device by displaying a quick response (QR) code on a display of the client;

a data verification module for determining whether the transfer data are malicious based on a reputation of an entity referenced by the transfer data; and a display module for:

responsive to determining that the transfer data are not malicious, permitting display of the QR code encoding the transfer data on the display of the client; and responsive to determining that the transfer data are malicious:

preventing display of the QR code on the display of the client; and displaying a warning message to a user of the client; and a processor for executing the computer program modules.

15. The system of claim 14, wherein the monitoring module is further for:

detecting a request by a browser executing on the client to activate a module for generating a QR code encoding the transfer data.

16. The system of claim 14, wherein the data verification module is further for:

determining a reputation of an entity referenced by the transfer data, wherein the transfer data are determined not malicious responsive to the entity having a good reputation.

17. The system of claim 14, further comprises a code generation module for:

generating a QR code comprising a machine-readable visual representation of the transfer data; and interacting with the display module for displaying the QR code on the display of the client.

* * * * *